Jan. 7, 1941.  G. W. KILDAY  2,227,652
MILK-HANDLING DEVICE
Filed Jan. 9, 1939  2 Sheets-Sheet 1

G. W. Kilday
INVENTOR.
BY ...
ATTORNEYS.

Jan. 7, 1941.  G. W. KILDAY  2,227,652
MILK-HANDLING DEVICE
Filed Jan. 9, 1939  2 Sheets-Sheet 2

G. W. Kilday
INVENTOR.
BY
ATTORNEYS.

Patented Jan. 7, 1941

2,227,652

UNITED STATES PATENT OFFICE 2,227,652

MILK-HANDLING DEVICE

Glen William Kilday, Kingsport, Tenn.

Application January 9, 1939, Serial No. 250,013

1 Claim. (Cl. 31—4)

This invention aims to provide, in an inexpensive form, a device adapted to be used by the wholesale milk handler, and so constructed that the milk will be cooled immediately, thereby retarding bacterial activity, the milk being aerated to eliminate animal heat and odor or off flavor, a stirring of the milk, in order to cool it, being obviated, and the general construction being such that the article is sanitary, in that it may be taken down readily for cleaning or sterilization.

A mechanic who abides by what is claimed can make changes in the precise form shown, without departing from the spirit of the invention.

Figure 1:
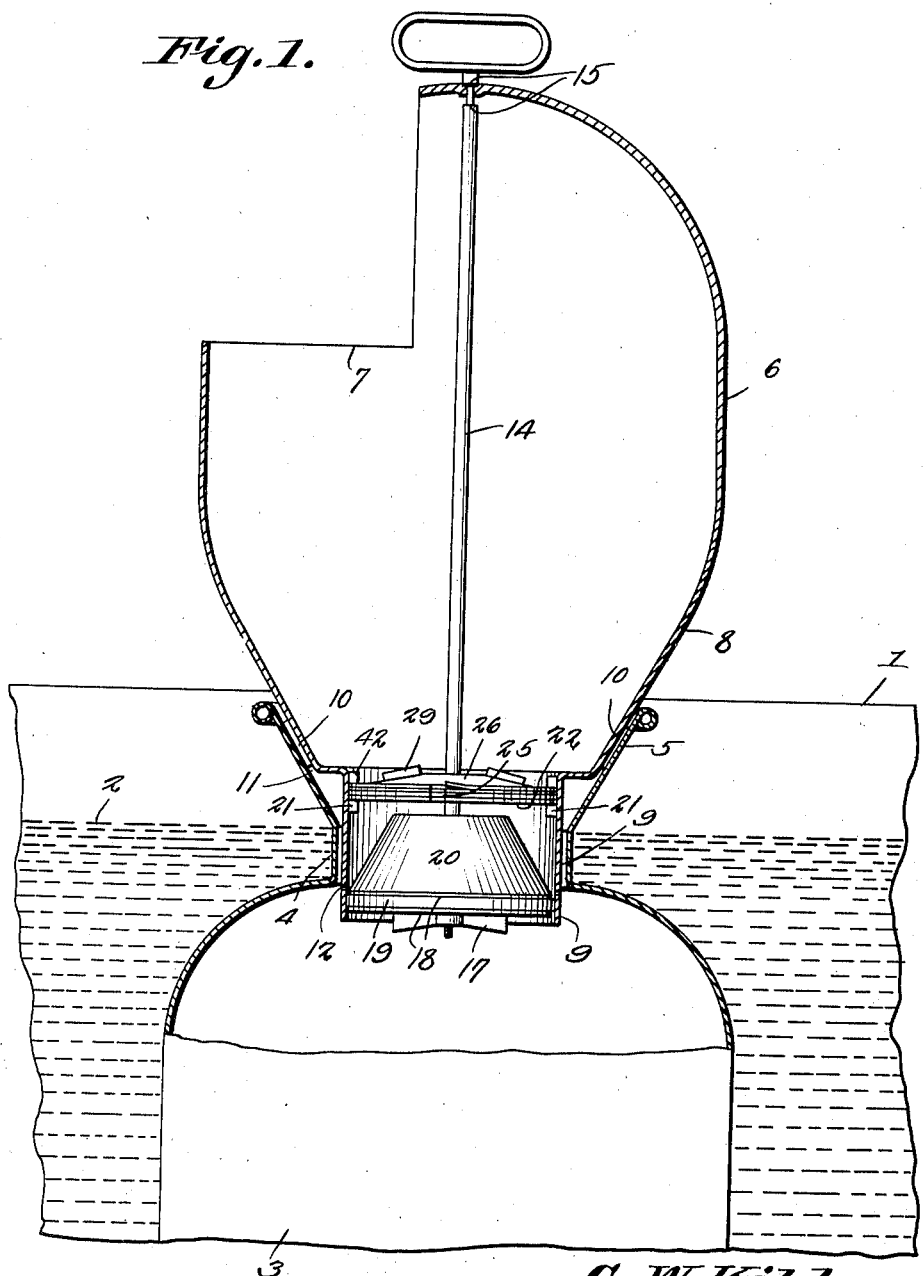
Fig. 1 is a vertical section wherein the device is assembled with a milk can.
Figure 2:
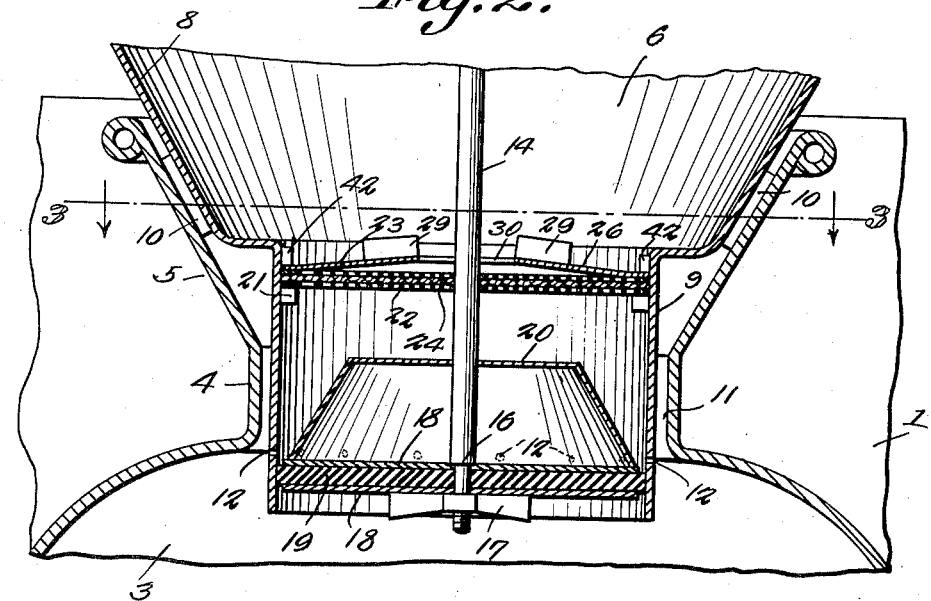
Fig. 2 is a vertical sectional view wherein parts are enlarged from the showing of Fig. 1.
Figure 3:
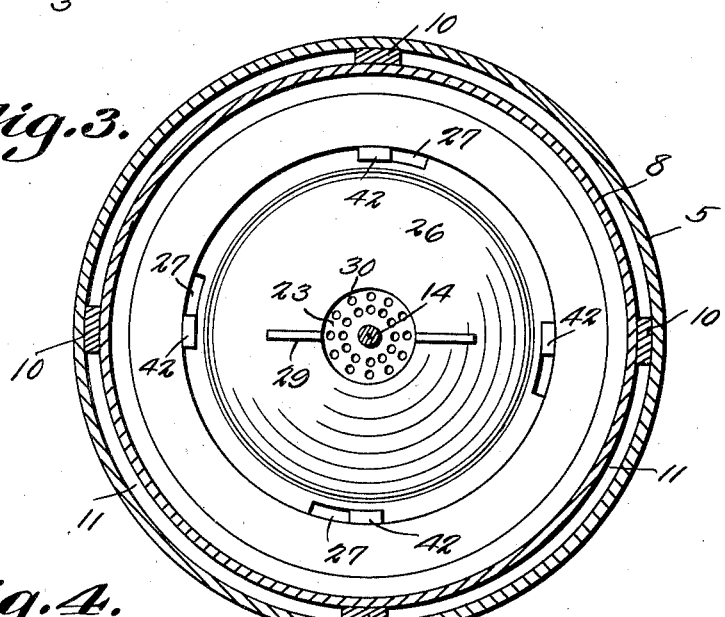
Fig. 3 is a cross section on the line 3—3 of Fig. 2.

The numeral 1 marks a tank, containing a cooling medium 2, such as ice water or brine, and in the cooling medium is located a milk can 3 having a reduced neck 4, extended to form a flared mouth 5 which projects upwardly above the level of the cooling medium 2.

The numeral 6 designates a balloon-shaped container, provided in its top and at one side with an inlet opening 7, the container having a downwardly tapered intermediate portion 8, merging into a cylindrical sleeve 9, there being external lugs 10 on the tapered intermediate portion 8, spacing the part 8 from the mouth 5 of the milk can, and spacing the sleeve 9 from the neck 4 of the milk can, to form a passage 11 by which air can find an exit from the can 3, as milk accumulates in it. The neck 9 is supplied, near its lower end, with circumferentially spaced, small perforations 12, and when the container 6 is seated in the upper part of the milk can 3, the lugs 10 stop the downward movement of the milk can, and the perforations 12 are so located that they will spray the milk on the underside of the crown of the milk can 3, and downwardly upon the inner surface of the body of the can.

The numeral 14 marks a plunger which has limited vertical movement, in the top of the container 6, since the plunger has spaced stop shoulders 15, between which the top of the container is located. Near its lower end, the plunger 14 is provided with an abutment 16, a holding device, such as a nut 17, being threaded on the lower end of the plunger. A valve is bound between the abutment 16 and the nut 17, and preferably embodies disks 18, between which is placed a resilient packing washer 19. The packing washer or disk 19 has a close sliding fit in the sleeve 9 of the container 6. The vertical throw limited by the shoulders 15 is such that when the plunger 14 is depressed, the perforations 12 in the sleeve 9 will be open, but when the plunger is raised, the packing disk 19 of the valve will close the perforations. A frusto-conical deflector 20 is supported on the uppermost of the disks 18, the plunger 14 passing removably through the top of the deflector.

Near its upper end, the sleeve 9 of the container 6 is provided with circumferentially spaced brackets 21, and above the brackets are located keepers 42. A strainer rests on the brackets 21, and is made up of a perforated lower disk 22, a perforated upper disk 23, and a thin strainer pad 24 between the disks, the strainer pad being made of gauze, cotton or the like. The parts last above enumerated are peripherally notched, as shown at 25 in Fig. 1, so that they can be slid down on the brackets 21, past the keepers 42.

Figure 4:
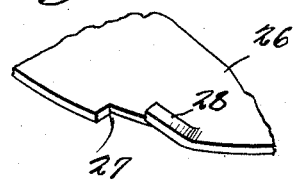
Fig. 4 is a fragmental perspective showing a portion of the fastener or cover for the strainer.

On top of the strainer 22—24—23 is placed an upwardly dished cover or retainer 26 which, as shown in Fig. 4, has peripheral notches 27, there being upwardly inclined tongues 28 at the ends of the notches. When the cover or retainer 26 is rotated, the tongues 28 guide the keepers 42 into the notches 27 and, when the cover or retainer is rotated far enough, the keepers 42 engage above the cover or retainer 26, the part 26 holding the filter 22—24—23 tightly compacted.

For the convenient rotation of the cover 26, it is provided with upstanding wings 29, located on opposite sides of a central opening 30 in the cover.

By means of the plunger 14, the valve is raised until the packing disk 19 covers the perforations 12 of the neck 9 of the container 6. Milk is poured into the container 6, through the inlet opening 7, until a sufficient head of milk is created in the container. Then the plunger 14 is pushed downwardly, until the packing disk 19 uncovers the opening 12. The milk flows downwardly through the opening 30 of the cover 26, and through the strainer 22—24—23, where the suspended impurities in the milk are removed. The outwardly and downwardly inclined circumferential wall of the deflector 20 carries the milk to the perforations 12 of the sleeve 9, and a head is created at the openings 12. The milk spurts through the perforations 12 and is sprayed on the inside of the milk can 3.

The device, although simple in structure, consummates the objects set forth in the opening part of this specification, inasmuch as the milk is strained, aerated and cooled, with no operations other than those involved in pouring the milk into the container 6 and raising or lowering the plunger 14.

Having thus described the invention, what is claimed is:

In a milk handling device, a can having a top provided with a neck, a container in the neck, means for spacing the container from the neck, to form an open annular air outlet for the can and disposed about the container, the container having circumferentially-spaced perforations discharging laterally into the can in the same plane with the under surface of the top, at the place where air from the can enters the air outlet, a valve under the control of an operator and movably assembled with the container, the valve opening the perforations, and closing them to produce a head sufficient to discharge milk through the perforations and across the air passing upwardly through the outlet, the aforesaid location of the perforations with respect to the under surface of the top effecting lateral dispersion of air into the milk, along the under surface of the top, and a deflector on top of the valve and having a downwardly and outwardly inclined circumferential surface leading to the perforations.

GLEN WILLIAM KILDAY.